US007106571B2

(12) United States Patent
Katoda

(10) Patent No.: US 7,106,571 B2
(45) Date of Patent: Sep. 12, 2006

(54) MAIN ELEMENT OF A SURGE PROTECTOR DEVICE

(76) Inventor: Takashi Katoda, 4804-83, Ikku, Kochi-shi, Kochi-shi, Kochi (JP) 780-8130

( * ) Notice: Subject to any disclaimer, the term of this patent is extended or adjusted under 35 U.S.C. 154(b) by 248 days.

(21) Appl. No.: 10/752,586

(22) Filed: Jan. 8, 2004

(65) Prior Publication Data

US 2004/0141277 A1 Jul. 22, 2004

Related U.S. Application Data

(62) Division of application No. 09/931,718, filed on Aug. 20, 2001, now Pat. No. 6,697,242.

(30) Foreign Application Priority Data

Aug. 28, 2000 (JP) ............................ 2000-256879

(51) Int. Cl.
*H02H 3/22* (2006.01)

(52) U.S. Cl. ...................................................... 361/111

(58) Field of Classification Search ................ 361/118, 361/91.2, 103, 111, 117
See application file for complete search history.

(56) References Cited

U.S. PATENT DOCUMENTS 2,592,399 A * 4/1952 Edsall et al. ................ 337/161
3,992,650 A 11/1976 Iwasa et al.
4,041,436 A * 8/1977 Kouchich et al. ............. 338/21
4,042,889 A 8/1977 Baker
4,064,475 A * 12/1977 Kouchich et al. ............. 338/20
4,272,754 A * 6/1981 Lou ............................ 338/21
5,369,390 A * 11/1994 Lin et al. ....................... 338/21
5,404,126 A * 4/1995 Kasai et al. .................. 338/21
5,438,473 A * 8/1995 Allina ........................ 361/118
5,625,521 A 4/1997 Luu
5,699,035 A * 12/1997 Ito et al. ........................ 338/21
6,226,162 B1 * 5/2001 Kladar et al. ................. 361/56
6,542,065 B1 * 4/2003 Shrier et al. .................. 338/21
6,599,463 B1 * 7/2003 Miyazaki et al. ........... 264/614
6,636,409 B1 * 10/2003 Kladar et al. ............... 361/127
6,655,012 B1 * 12/2003 Katoda ........................ 29/623
6,697,242 B1 * 2/2004 Katoda ...................... 361/91.2

* cited by examiner

*Primary Examiner*—Brian Sircus
*Assistant Examiner*—Boris Benenson
(74) *Attorney, Agent, or Firm*—Eric J. Robinson; Robinson Intellectual Property Law Office, P.C.

(57) ABSTRACT

The present invention is directed to a main element of a surge protector device and its fabrication method which uses breakdown phenomenon of a single high resistive film. A breakdown voltage and a place where breakdown occurs can be precisely controlled. The surge protector device changes from its non-conductive state to conductive state very quickly when a surge is induced and returns quickly to the non-conductive state when a surge is removed if said element is surrounded by oxidizing agent.

The main element of the surge protector device of the present invention has a single high resistive film on a single metal bar. The high resistive film has a part or parts where electric field concentrates when a surge induced. A breakdown voltage can be controlled precisely by controlling a size including a thickness of the high resistive film of the part. The part is called a fuse part. The main element includes also at least two parts on said metal bar which are continuous to said fuse part. Electrodes are formed on said at least two parts. Therefore said at least two parts are called pad parts.

16 Claims, 5 Drawing Sheets

MAIN ELEMENT OF A SURGE PROTECTOR DEVICE

BACKGROUND OF THE INVENTION

1. Field of the Invention

The present invention relates to a main element of a protector device and its fabrication method which returns itself to its non-conductive state in a very short time after conversion to its conductive state by a surge including thunder.

2. Related Background Art

A surge protector device including an arrester is very important device to protect various electronic devices from surge including thunder, where the term "thunder" means lightning due to an electrical phenomenon in the atmosphere. The surge protector device is a general name of devices which are used in order to protect other electronic devices from excess voltage, that is surge. An arrester is used to protect other electronic devices from thunder, that is extremely high voltage and large current. The arrester is one of the surge protector devices. The term of "protector device" is used here to indicate devices which are used in order to protect other electronic devices from excess voltage or excess current. However excess voltage is not limited to extremely high voltage such as thunder but includes low voltage if it is excess to a specified voltage.

A glass-tube type arrester has been used. It contains special gas between two electrodes in a glass tube. It is non-conductive unless surge is induced. When surge or thunder is induced, discharge starts and the gas between the electrodes changes to conductive. Current flows through the arrester and, it is lead to the earth. Discharge does not stop immediately after surge is removed. The arrester cannot protect other electronic devices from continuous current or next attack by surge or thunder. There are serious problems which a glass-tube and other type protector devices have which have been used. One of it is that a protector device must change from its resistive state to a conductive state in a very short time such as 0.03 μsec. when it is attacked by surge. Another problem is that a protector device should return from its conductive state to its resistive state when surge is removed.

In order to solve these problems in the prior art an arrester was proposed (Japanese Patent 118361, 1995 "Molybdenum arrester" by Seita Ohmori). It used a plural of molybdenum bars whose surface was oxidized. The arrester will be called here as a "molybdenum arrester".

The molybdenum arrester leads current to the earth in a very short time when surge or thunder is induced. That is, it changes from non-conductive state to conductive state very quickly by breakdown of the oxide formed on the molybdenum bar. Moreover, it returns from conductive state to non-conductive state when surge or thunder is removed because molybdenum is oxidized quickly if it is in oxidizing atmosphere. The molybdenum arrester is very useful and economically efficient because it repeats change of the state automatically.

It is possible to use metals other than molybdenum in a protector device which functions with same principle as the molybdenum arrester. Tantalum, chromium and aluminum are included in such metals.

There is a serious problem in a protector device of the prior art which comes from the fact that the protector device uses a plurality of bars which have high resistive films on their surfaces. FIG. 1 shows schematically the protector (10) of the prior art which is called the molybdenum arrestor proposed by Ohmori (Japanese Patent 118361, 1995 Molybdenum arrester").

The arrestor (10) includes two molybdenum bars (11) which have high resistive oxide films (12) on their surfaces and electrodes (13). The arrestor (10) uses breakdown phenomenon at the interface between the high resistive films (12). A breakdown voltage depends largely on microscopic structure of the interface. That is, as shown in FIG. 2, the high resistive films (12) on the two molybdenum bars contact point by point microscopically although they seem to contact line by line or surface by surface macroscopically. It is difficult to control the microscopic structure at the interface during fabrication process. Breakdown occurs at a point where largest electric field is applied by a surge. A breakdown voltage also depends on force induced to the interface. Therefore, it is impossible to design and fabricate the arrestor of the prior art with a precisely controlled breakdown voltage. The problem cannot be solved as far as a protector device uses breakdown phenomenon at the interface between two surfaces.

It is desirable, therefore, to provide a surge protector device which does not use breakdown phenomenon at the interface between two surfaces.

SUMMARY OF THE INVENTION

The present invention is directed to a main element of a surge protector device and its fabrication method which uses breakdown phenomenon of a single high resistive film. Although the term "breakdown" may be used in a manner associated with a PN junction, the term "breakdown" is used here because the single high resistive film changes from a high-resistive condition to a low-resistive condition when a large voltage is applied similarly to a PN junction. A breakdown voltage and a place where breakdown occurs can be precisely controlled. The surge protector device changes from its non-conductive state to conductive state very quickly when a surge is induced, and returns quickly to the non-conductive state when a surge is removed if the element is surrounded by oxidizing agent.

The main element of the surge protector device of the present invention has a single high resistive film on a single metal bar. The high resistive film has a part or parts where electric field concentrates when a surge induced. A breakdown voltage can be controlled precisely by controlling a size including a thickness of the high resistive film of the part. The part is called a fuse part here. Although a "fuse" may be used to describe an electrical safety device consisting of or including a wire or strip of fusible metal that melts and interrupts the circuit when the current exceeds a particular amperage, the part is called a "fuse part" here because it changes its resistive condition when the current exceeds a particular amperage or the voltage exceeds a particular value. It is possible, therefore, to form a plurality of fuse parts such that they have the same breakdown voltage or different breakdown voltages.

A preferred metal is molybdenum although other metals can be used.

The surge protector device of the present invention is fabricated by a method which includes following steps. At the first step, a metal bar is prepared and washed with a suitable solvent followed by etching of the surface. At the second step, the metal bar is pre-heated in an atmosphere which does not contain oxygen in order to drive impurities from the bar. At the third step, an insulating film is formed in an atmosphere which contains no oxygen. At the fourth step, the insulating film is patterned to expose the main surface of the metal bar in the areas where two pad parts and at least one fuse part will be formed. In general, a size of the fuse part is much smaller than the pad parts. At the fifth step, the metal bar is oxidized in the areas which were exposed at the fourth step. A high resistive film is formed by this oxidation. At the sixth step, another insulating film is formed on the entire surface of the metal bar. The previously formed insulating film and an oxide film are covered by the new insulating film. At the seventh step, the new insulating film is patterned to expose the high resistive film in the area of the fuse part. At the eighth step, the high resistive film is etched to a predetermined thickness in the fuse part. Then the new insulating film is removed from the pad areas. At the ninth step, electrodes are formed on the high resistive film in the pad areas.

DETAILED DESCRIPTION OF THE PREFERRED EMBODIMENTS

Reference will now be made in greater detail to preferred embodiments of the invention.

Figure 1:
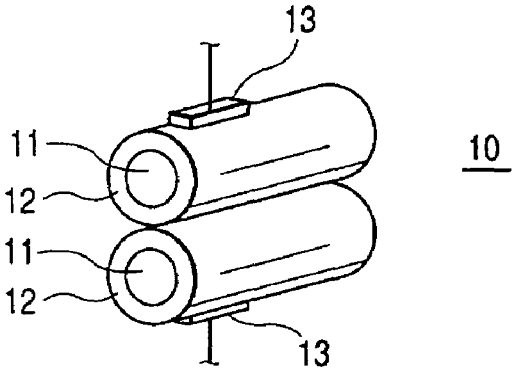
FIG. 1 is a schematic view of a prior art surge protector device which includes two cylindrical molybdenum bars with high resistive films grown by oxidation.
Figure 2:
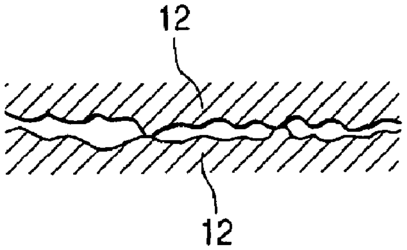
FIG. 2 is a schematic view of the interface between the two molybdenum bars with oxide films on their surface.
Figure 3:
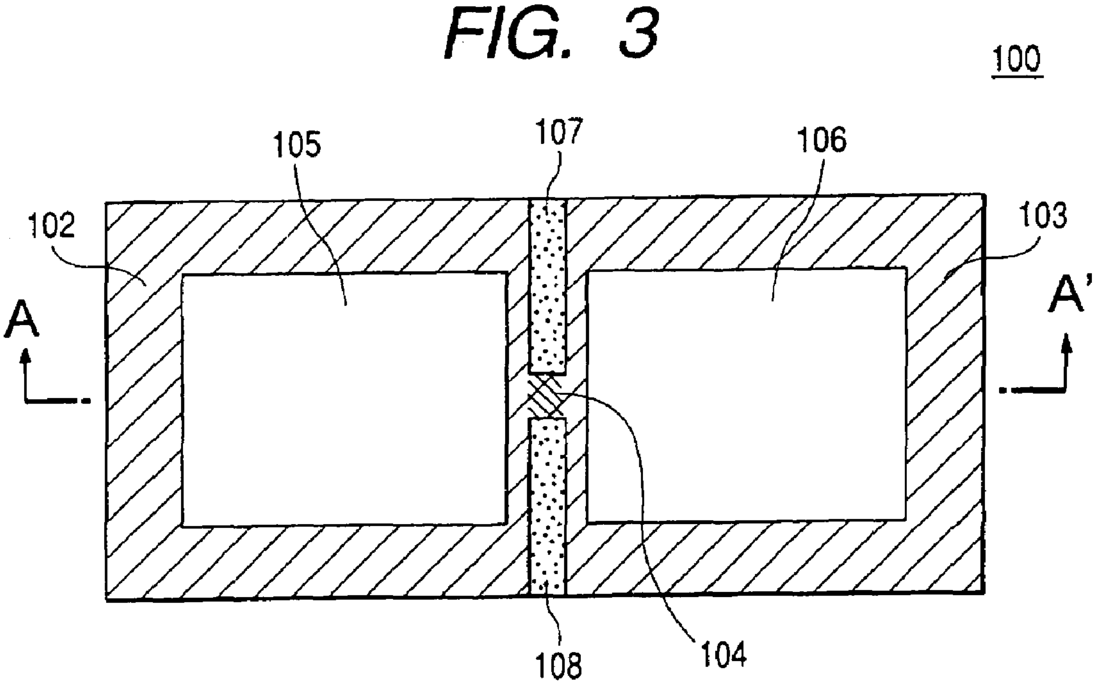
FIG. 3 is a top view of the main element of the surge protector device according to an embodiment of the present invention.
Figure 4:
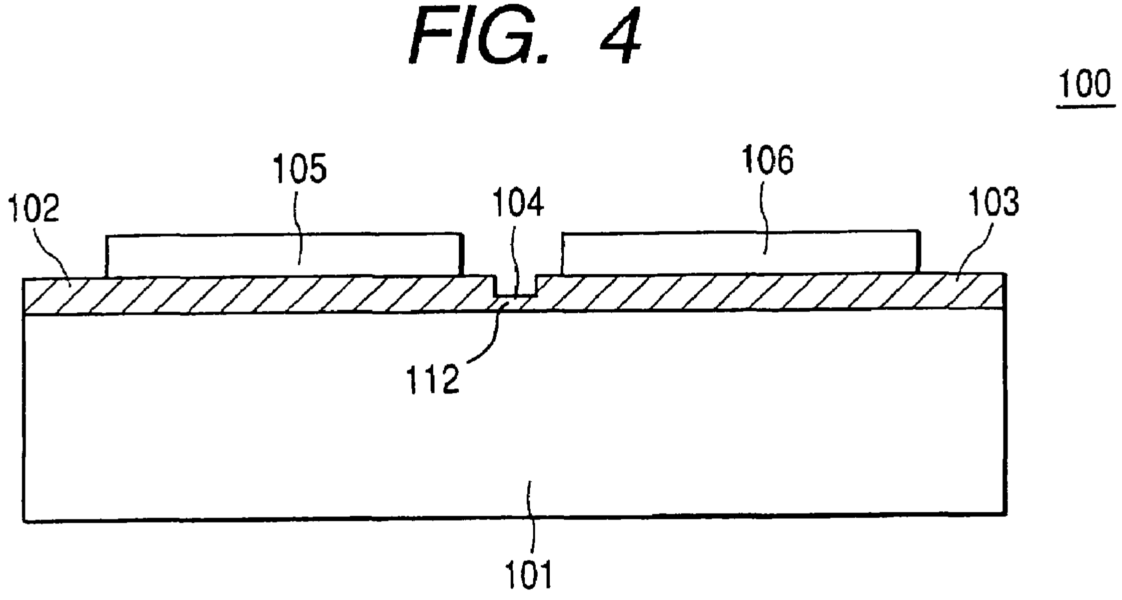
FIG. 4 is a cross-sectional view of the main element along line A–A' shown in FIG. 3.

FIG. 3 is a top view of a main element (100) of the surge protector device according to one embodiment of the present invention. FIG. 4 is a cross sectional view of the main element (100) obtained along line A–A' in FIG. 3.

The main element (100) of the protector device according to an embodiment of the present invention contains a metal bar (101) and a high resistive film (102, 103) and (104). The high resistive film (102, 103) and (104) was formed by oxidation of the metal bar (101). The metal bar comprises of molybdenum in this embodiment. A part (104) of the high resistive film has a thickness smaller than that of the parts (102) and (103) as shown in FIG. 4. The part (104) has also a smaller size than that of the parts (102) and (103) as shown in FIG. 3. Electric field concentrates at the part (104) and breakdown occurs there when a surge excess a threshold is induced. Therefore the part (104) is called a "fuse part". Although a "fuse" may be used to describe an electrical safety device consisting of or including a wire or strip of fusible metal that melts and interrupts the circuit when the current exceeds a particular amperage, the part is called a "fuse part" here because it changes its resistive condition when the current exceeds a particular amperage or the voltage exceeds a particular value.

On the other hand, electrodes (105) and (106) are formed on the parts (102) and (103) of the high resistive film. The parts (102) and (103) are called "pad parts".

The main element (100) includes also an insulating film (107) and (108) which surrounds the fuse part (104) and the pad parts (102) and (103). When breakdown occurs at the fuse part (104) by a surge and re-oxidized after a surge is removed, a new oxide film is formed only in the part (104). That is, a new fuse part is limited only in the part (104). It is desirable that the insulating film (107) and (108) has an electric resistivity higher than that of the high resistive film (102), (103) and (104). Although preferable materials as the insulating film are silicon dioxide, silicon nitride and aluminum oxide, other materials can be used.

In one embodiment, electrodes (105) and (106) are formed of aluminum. The electrodes (105) and (106) are formed inner side of the pad parts (102) and (103). That is, edges of the electrodes (105) and (106) are not near the fuse part (104) in order not to occur breakdown except the fuse part (104).

Figure 5:
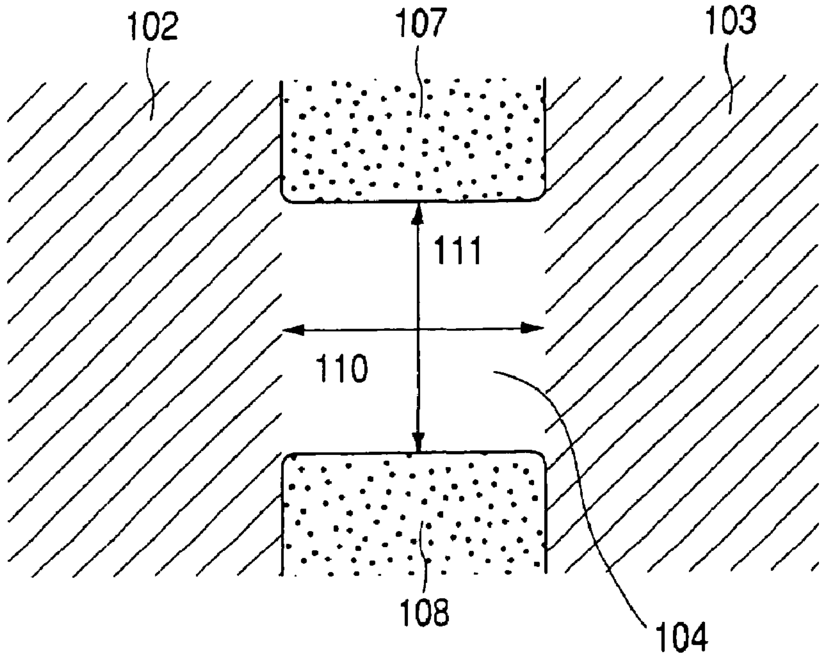
FIG. 5 is an enlarged view around the fuse part of the main element according to an embodiment of the present invention.

FIG. 5 shows an area near the fuse part (104). Breakdown occurs at the fuse part (104) when a surge is induced. A breakdown voltage is determined by some factors such as a composition of the high resistive film, molybdenum oxide in this embodiment, a width (110), a length (111) and a thickness (112) of the fuse part (104). For example, in an embodiment, a width (110) was 100 μm, a length (111) was 100 μm and a thickness (112) (shown in FIG. 4) was 20 μm, and the high resistive film was made of molybdenum oxide. The breakdown voltage of the protector device was 600 V.

It is possible to make a protector device with a desired breakdown voltage by designing these parameters. In practice, the fuse part (104) has a size of several tens microns to several hundred microns while the pad parts (102) and (103) have a size of millimeters to centimeters. Therefore in FIG. 5 each part is not shown in scale in order to make ease of understanding of the present invention. That is, the fuse part (104) is shown much larger than that formed in practice.

Figure 6:
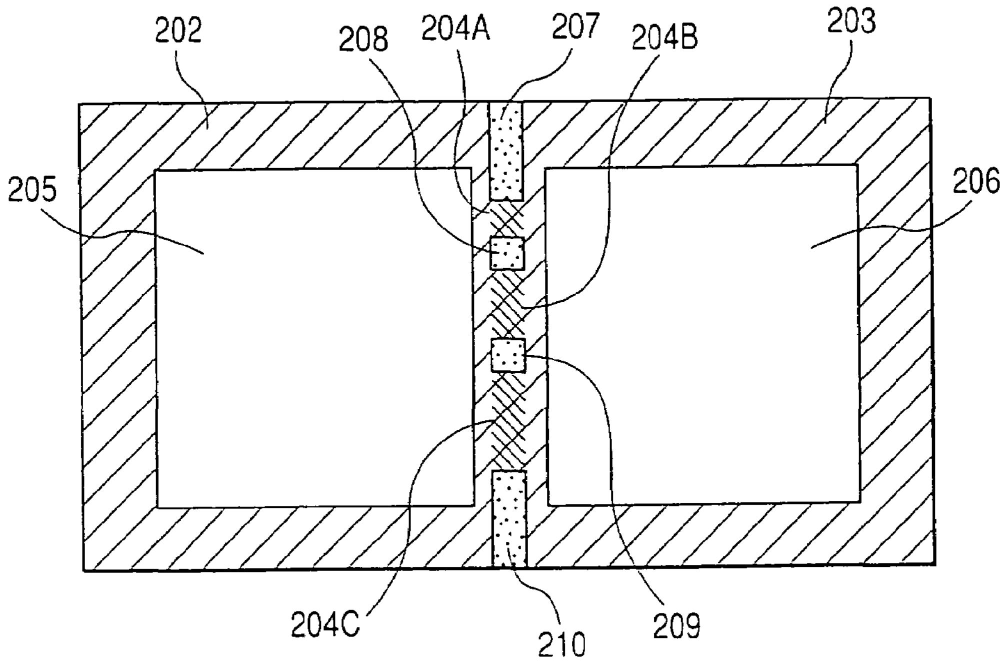
FIG. 6 is a top view of the main element of the surge protector device according to the second embodiment of the present invention.

Number of the fuse part in a protector device is selected depending on applications. FIG. 6 shows the second embodiment in which three fuse parts (204A, 204B, 204C) are shown. The fuse parts (204A, 204B, 204C) are made of a high resistive film grown by oxidation of molybdenum and are continuous to the pad parts (202, 203) which are also formed of the same oxide film. A thickness of the fuse parts is the same as that of the pad parts or smaller than that of the pad parts. As similar to the first embodiment described with reference of FIGS. 3–5, masks (207~210) of an insulating film such as silicon dioxide or silicon nitride are formed. Electrodes (205, 206) are formed on the pad parts (202, 203).

Although all of the fuse parts (204A, 204B, 204C) had the same length of 100 μm and the same thickness of 20 μm, they had different widths. That is, the width of the first fuse part (204A) was 100 μm, that of the second fuse part (204B) was 200 μm and that of the third fuse part (204C) was 300 μm, and the fuse parts are connected in parallel electrically. A surge voltage is applied to the fuse parts at the same time.

Breakdown voltages of the three fuse parts were 600, 1200 and 1800 volts, respectively corresponding to the widths.

The breakdown voltage of the device which has a plurality of fuse parts can be also controlled by changing thicknesses, lengths or widths of the fuse parts similarly to the device with a single fuse part.

Figure 7:
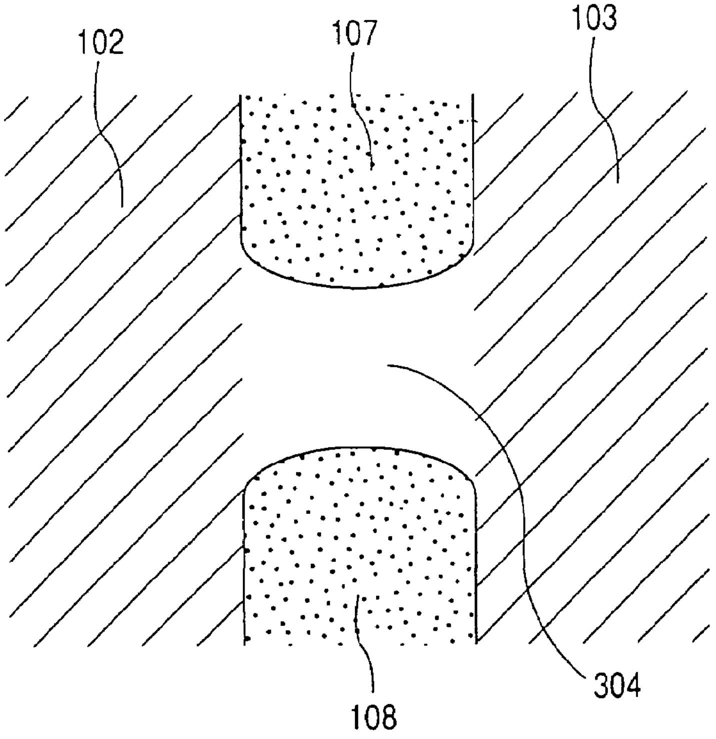
FIG. 7 is an enlarged schematic view around the fuse part of the main element according to other embodiment.

Although the fuse part is shown to be rectangular or square in the two embodiments described above as shown in FIGS. 3, 5 and 6, the shape of the fuse part is not restricted to be shape defined by straight lines as far as the breakdown voltage of the fuse part is smaller than that of the pad parts. FIG. 7 is a top view of such example. In the example, the fuse part (304) has an outline of curved lines and the width of the central part is smaller than those of other parts.

In the embodiments as shown in above description, various parts are formed on a flat plate of a metal. It is not restricted, however, to use a flat plate and they can be formed on other shape of metal such as a cylinder as the prior art molybdenum arrester.

Figure 8A:
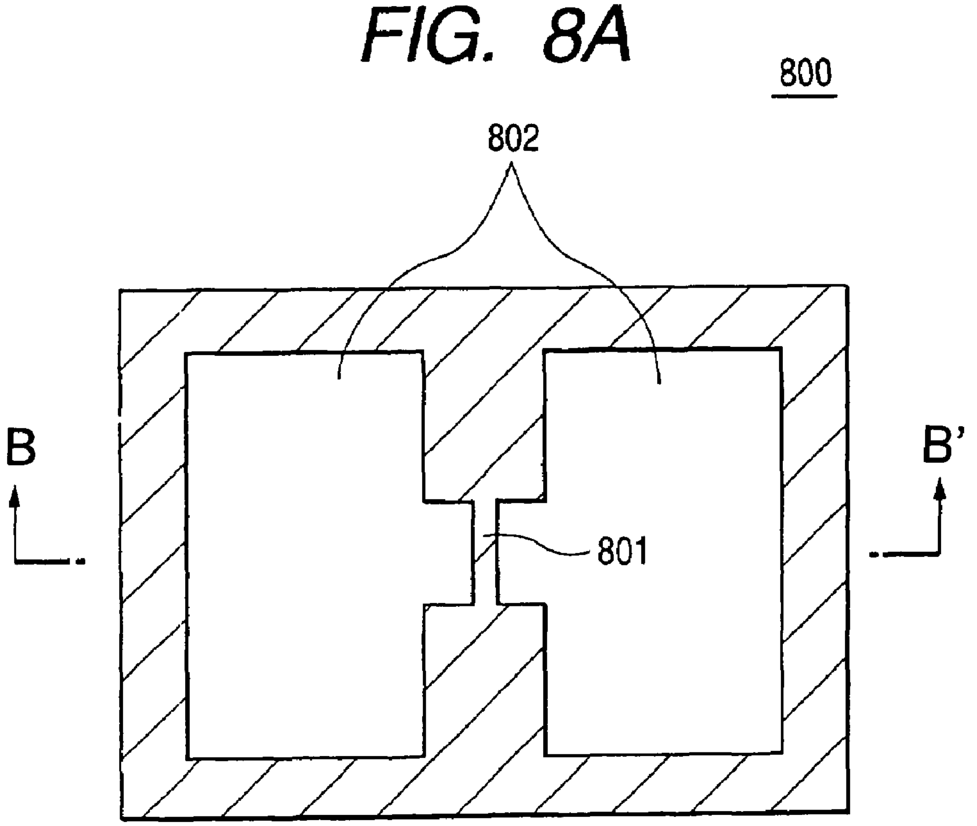
FIG. 8*a* is a top view of the main element of the surge protector device according to further embodiment of the present invention.
Figure 8B:
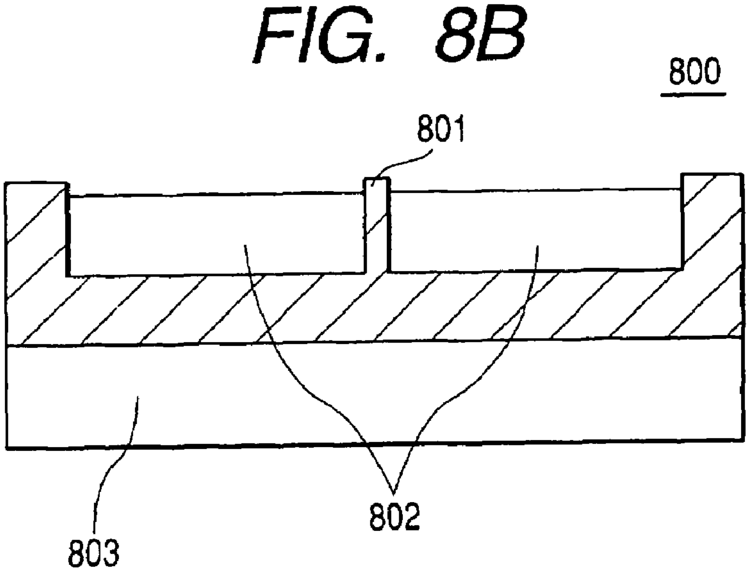
FIG. 8*b* is a cross sectional view of the main element of the surge protector device according to further embodiment of the present invention.

FIG. 8 shows another embodiment of the present invention which utilizes breakdown phenomenon of a high resistive film. The surge protector device 800) shown in FIG. 8 has a fuse part (801) which is sandwiched by two electrodes (802) as shown in the top view (FIG. 8(*a*)). The fuse part (801) is a part of a high resistive film formed by oxidation of a molybdenum plate (803). FIG. 8(*b*) is a cross sectional view of the protector device along line B–B' in FIG. 8(*a*). The electrodes (802) are formed in the areas where a thickness of the high resistive film is smaller than that of the fuse part (801). It is desirable that the fuse part (801) has a narrower area as shown in FIG. 8(*a*) and a width of the fuse part (801), that is a length between the areas on which the electrodes (802) are formed, is smaller than the thickness of the high resistive film in the areas where the electrodes are formed as shown in FIG. 8(*b*).

Figure 9:
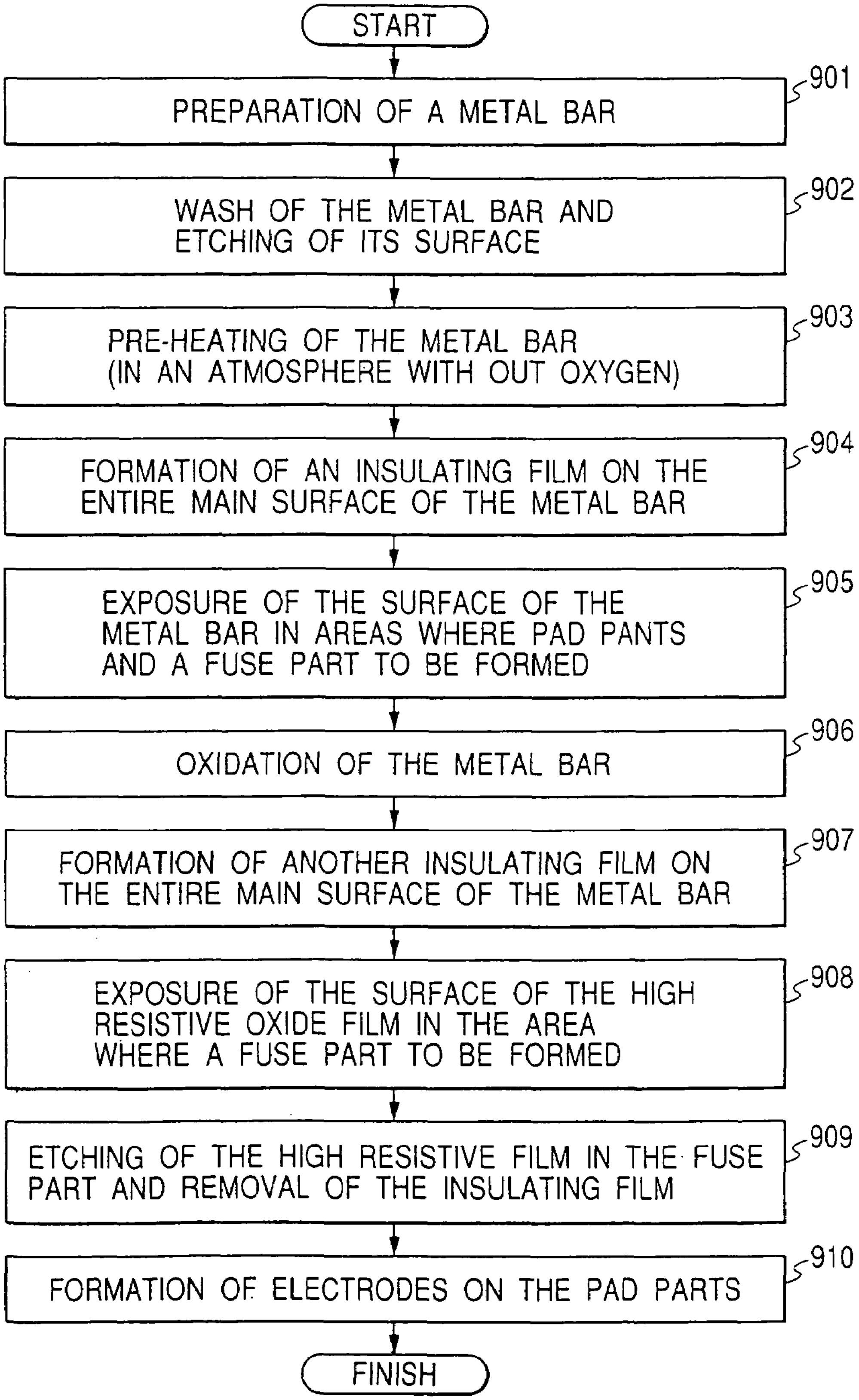
FIG. 9 is a flow chart diagram of the fabrication process of the main element of the surge protector device according to an embodiment of the present invention.

Then we will show an example of a method to fabricate a main element of the protector device as shown in FIGS. 3~5 according to one embodiment of the present invention. FIG. 9 shows flow of fabrication process of the main element of the surge protector device according to one embodiment of the present invention.

At first, a molybdenum plate (101) is prepared (901). It is washed by a suitable organic solvent and etched its surface with a suitable acid followed by cleaning with water of a high purity in the first step (902).

At the second step (903), the molybdenum plate (101) is heated for 30 minutes at 800° C. in an atmosphere comprising of hydrogen 20% and argon 80%. The step is called pre-annealing of the molybdenum plate and is done as described in the applicant's patent application previously filed (U.S. patent application Ser. No. 09/818,494 "PROTECTOR DEVICE").

At the third step (904), an insulating film made of, for example, silicon dioxide or silicon nitride is formed on the main surface of the molybdenum plate by a well known method such as sputtering.

At the fourth step (905), the surface of the molybdenum plate (101) is exposed selectively by lithography in the areas where the fuse part (104) and the pad parts (102, 103) will be formed. Lithography is well known in the art.

At the fifth step (906), the exposed surface of the molybdenum plate (101) is oxidized. The oxidation is done as described in the applicant's earlier patent application (U.S. patent application Ser. No. 09/818, 494). A typical example of the oxidation is that a temperature is 700° C., a period is 40 minutes and an atmosphere comprises high purity oxygen including steam 10% in volume. Typically a high resistive film with a thickness of 40 μm is formed. The insulating film such as silicon dioxide or silicon nitride may be removed at this point.

At the sixth step (907), another insulating film such as silicon dioxide or silicon nitride is formed on the entire surface by a suitable method. It is desirable that the insulating film is formed at a low temperature by a method such as spattering.

At the seventh step (908), the surface of the high resistive film is exposed by lithography in an area where the fuse part (104) will be formed.

At the eighth step (909), the high resistive film in the area exposed at the seventh step is etched to make a thickness of the fuse part (104) small. The thickness of the high resistive film at the fuse part was 20 μm after the etching. After the etching, the insulating film such as silicon dioxide or silicon nitride is removed from the pad parts (102, 103).

At the ninth step (910), electrodes (105, 106) are formed on the pad parts (102, 103). The main element of the protector device according to one embodiment of the present invention is completed at this point.

The protector device is completed by fixing the main element in a case with a mixture of oxidizing and refractory agents if necessary and forming electrical contacts to outside of the case.

A mixture is described in the applicants patent application previously filed (U.S. patent application Ser. No. 09/818, 494) Preferable oxidizing agents include potassium chlorate, magnesium peroxide, calcium oxide, and copper oxide. Preferable refractory agents include silica ($SiO_2$) and zircon ($ZrSiO_4$). The mixture includes typically the oxidizing and refractory agents in a ratio 1:5 to 5:1 in weight for an usual arrester. In an embodiment, a mixture of potassium chlorate (oxidizing agent) and silica (refractory agent) in a ratio of 1:3 (in weight) was used.

When a protector device has a plurality of fuse parts as shown in FIG. 6 and they have the same thickness, it is necessary only to change the mask pattern used in the lithography at the seventh step (908). It is necessary, however, to repeat the steps from the sixth one (907) to the eighth one (909) as the same number as the number of the kinds of thickness the fuse parts have. That is, at the seventh step (908) described above, only the first fuse part (204A) is exposed and it is etched at the eighth step (909). After the etching of the first fuse part (204A), the insulating film is removed and a new insulating film is formed on the entire surface again as the sixth step (907). Then the seventh and eighth steps are repeated to etch the second fuse part (204B). If the main element has fuse parts more than two and they have different thicknesses, the same steps are repeated. It is necessary, however, to change etching time to leave the fuse parts with different thicknesses depending on design.

In the fabrication process of the main element of the protector device according to the present invention, it is possible to form the pad parts at first and then to form the fuse part(s) or to form the fuse part(s) and then to form the pad part(s). If the high resistive films for the fuse part(s) and the pad part(s) are formed by the separate steps, the etching at the eighth step (909) is not necessary. It is necessary, however, that the high resistive film is continuous from the pad parts to the fuse part(s).

The process conditions described above are only to show illustrative embodiments. They may be changed depending on applications.

Moreover, although molybdenum was used as the metal in the embodiments described above, the metal is not limited to molybdenum. Other metals such as tantalum, chromium and aluminum can be used.

The protector device of the present invention may be constructed using single main element as described above or electrically connecting the elements in series or in parallel.

It is possible to provide the protector device with a specified breakdown voltage by the structure and the method of the present invention. The device returns itself from conductive state induced by a surge to non-conductive state quickly after a surge is removed if the element is put in oxidizing atmosphere.

Although the present invention has been in detail, those skilled in the art should understand that they can make various changes. Substitutions and alterations herein without departing from the spirit and scope of the invention.

What is claimed is:

1. A main element of a surge protector device comprising:

a plurality of fuse parts made of a high resistive film; and pad parts continuous to said fuse parts and on which electrodes are formed respectively;

wherein said fuse parts are formed such that breakdown occurs at one or more of said fuse parts and current flows between said electrodes when a surge of voltage or current in excess of a predetermined threshold value is induced between said electrodes;

wherein breakdown for each of said fuse parts occurs at the same threshold value or different threshold values of voltage or current.

2. A main element of a surge protector device according to claim 1, wherein said fuse parts have the same size or different sizes.

3. A main element of a surge protector device according to claim 2, wherein a size of said fuse parts is much smaller than that of said pad parts.

4. A main element of a surge protector device according to claim 2, wherein a thickness of said fuse parts is smaller than that of said pad parts.

5. A main element of a surge protector device comprising:

a plurality of fuse parts made of a high resistive film; and pad parts continuous to said fuse parts and on which electrodes are formed respectively;

wherein said fuse parts are formed such that breakdown occurs at one or more of said fuse parts and current flows between said electrodes when a surge of voltage or current in excess of a predetermined threshold value is induced between said electrodes and said one or more fuse parts are quickly formed again after a surge is removed;

wherein breakdown for each of said fuse parts occurs at the same threshold value or different threshold values of voltage or current.

6. A main element of a surge protector device according to claim 5, wherein said fuse parts have the same size or different sizes.

7. A main element of a surge protector device according to claim 6, wherein a size of said fuse parts is much smaller than that of said pad parts.

8. A main element of a surge protector device according to claim 6, wherein a thickness of said fuse parts is smaller than that of said pad parts.

9. A main element of a surge protector device comprising:

a metal bar;

at least two pad parts made of a high resistive film on said metal bar;

a plurality of fuse parts formed of said high resistive film continuous to said pad parts between them; and at least two electrodes formed on said at least two pad parts;

wherein said fuse parts are formed such that breakdown occurs at one or more of said fuse parts and current flows between said electrodes when a surge of voltage or current in excess of a predetermined threshold value is induced between said electrodes;

wherein breakdown for each of said fuse parts occurs at the same threshold value or different threshold values of voltage or current.

10. A main element of a surge protector device according to claim 9, wherein said fuse parts have the same size or different sizes.

11. A main element of a surge protector device according to claim 10, wherein a size of said fuse parts is much smaller than that of said pad parts.

12. A main element of a surge protector device according to claim 10, wherein a thickness of said fuse parts is smaller than that of said pad parts.

13. A main element of a surge protector device comprising:

a metal bar;

at least two pad parts made of a high resistive film on said metal bar;

a plurality of fuse parts formed of said high resistive film continuous to said pad parts between them; and at least two electrodes formed on said at least two parts;

wherein said fuse parts are formed such that breakdown occurs at said fuse part and current flows between said electrodes when a surge of voltage or current in excess of a predetermined threshold value is induced between said electrodes and said fuse part is quickly formed again after a surge is removed;

wherein breakdown for each of said fuse parts occurs at the same threshold value or different threshold values of voltage or current.

14. A main element of a surge protector device according to claim 13, wherein said fuse parts have the same size or different sizes.

15. A main element of a surge protector device according to claim 14, wherein a size of said fuse parts is much smaller than that of said pad parts.

16. A main element of a surge protector device according to claim 14, wherein a thickness of said fuse parts is smaller than that of said pad parts.

* * * * *